June 12, 1928.
J. MACCALLUM, JR
1,673,753
QUANTITY INDICATOR FOR LIQUIDS
Filed June 5, 1920
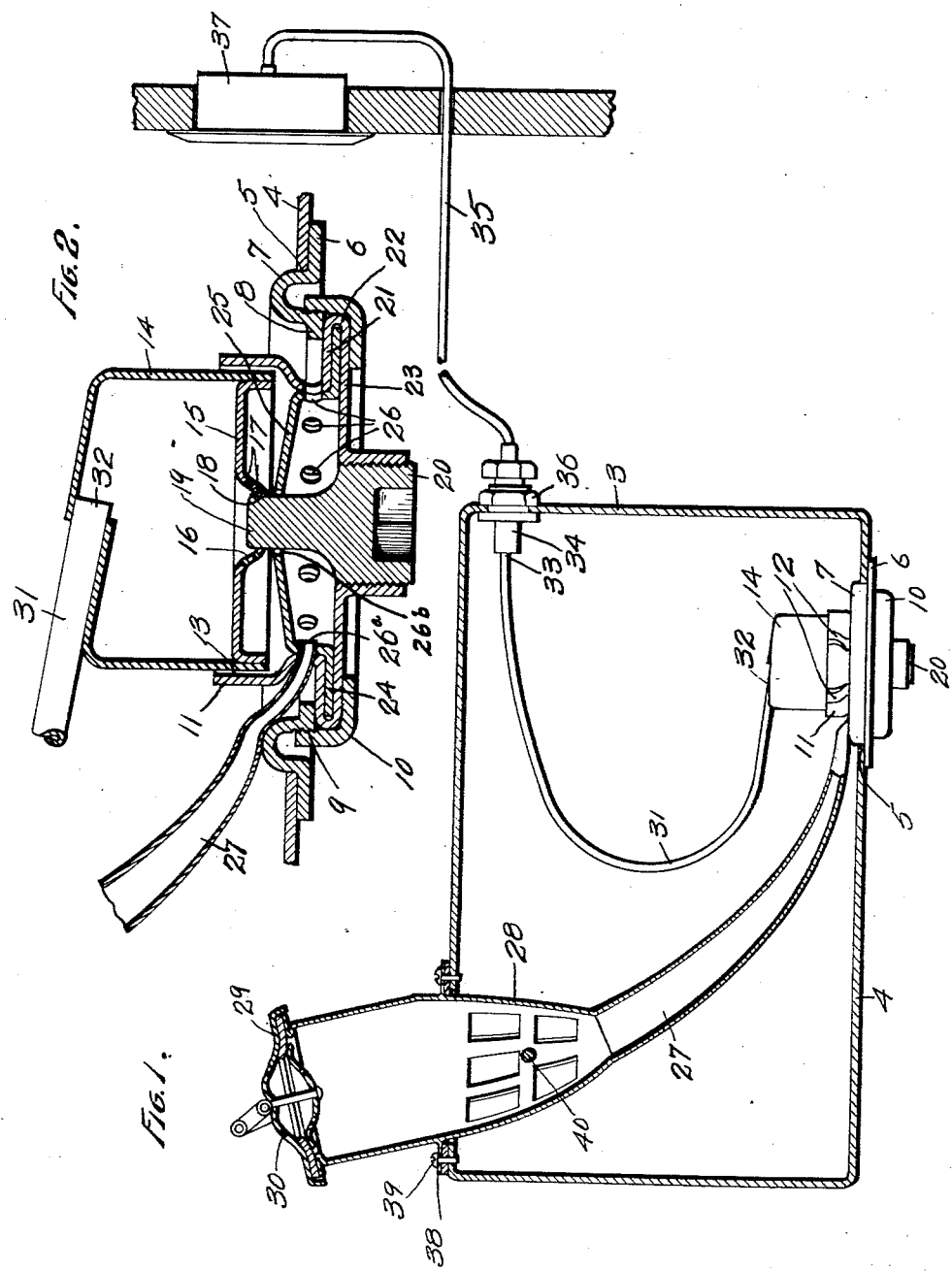
INVENTOR
JAMES MACCALLUM JR.
BY Edward E. Longan
ATTY.

Patented June 12, 1928.

1,673,753

UNITED STATES PATENT OFFICE.

JAMES MACCALLUM, JR., OF ST. LOUIS, MISSOURI.

QUANTITY INDICATOR FOR LIQUIDS.

Application filed June 5, 1920. Serial No. 386,674.

This invention relates to quantity indicators for liquids of the type that comprise an indicator or gauge which is operated by pressure created in a chamber by the weight or head of the liquid whose quantity or depth is to be determined, the gauge or indicator usually being arranged at a point some distance away from the pressure chamber and connected with said chamber in such a way that the pressure in said chamber will be exerted on the indicator.

One serious objection to quantity indicators of the general type referred to is that a diminution of the pressure used to operate the indicator caused by the contraction or compression of the gaseous medium in the conduit and pressure chamber or by the absorption of said gaseous medium by the liquid, permits the liquid to enter said pressure chamber, resulting in an incorrect reading of the indicator or gauge. Prior inventors have sought to overcome this objection by providing a pump or compressor, by means of which air under pressure can be admitted to the pressure chamber or conduit at intervals to compensate for the absorption or contraction of the air used to operate the gauge, and thus re-establish the correct pressure, but such devices require considerable attention on the part of the user to maintain them in operative condition and the addition of a pump or compressor adds considerable to the cost of the device. Moreover such prior devices are not constantly accurate but on the contrary are accurate only at the time when they are operated manually and are inaccurate at other times, namely when they are not operated manually.

One object of my invention is to provide an inexpensive device of simple design for indicating the depth or quantity of liquid in a container, which is so constructed that the operation of introducing liquid into the container, or the agitation, movement or splash of the liquid in said container due to the bodily movement of said container when mounted on a vehicle causes a gaseous medium to be supplied automatically to the pressure chamber with which the indicator or gauge communicates, in the event the pressure that is used to operate the indicator has become diminished through absorption, contraction, or other cause, of the gaseous medium which exerts pressure on the indicator.

Another object is to provide a novel method of automatically and continuously maintaining a practically constant volume of a gaseous medium in the pressure chamber or line of a quantity indicator for liquids of the general type referred to.

To this end I have devised a quantity indicator for liquids that comprises an indicator or gauge, a chamber constructed and arranged in such a way that the weight or head of the liquid whose depth or quantity is to be determined creates pressure in said chamber which varies as the level of said liquid varies, a conduit combined with said chamber and indicator in such a way that the pressure in said chamber will be exerted on said indicator, and means whereby the operation of introducing liqiud into the container or the agitation, movement or splash of the liquid in the container causes a gaseous medium to be discharged at a point in proximity to said pressure chamber and directed into said pressure chamber, to compensate for the absorption, contraction or leakage of the gaseous medium that exerts pressure on the indicator. The means just referred to preferably consists of a hollow member arranged in the liquid container with its upper end portion constructed in such a way that liquid will enter same during the operation of filling the container or will splash into same when the liquid in the container is agitated, and having its lower end terminating at a point below the pressure chamber. It is not essential however that said hollow member be of this particular construction and arrangement, so long as it is designed to receive liquid in which a gaseous medium is entrained, entrapped or trapped, and conduct said liquid to a point where the entrained, entrapped or trapped gaseous medium will be released and directed into the pressure chamber. The particular construction and arrangement of the pressure chamber is also immaterial, so far as my broad idea is concerned, but in most instances said chamber will be formed by a hollow member arranged adjacent the bottom of the liquid container and provided at its lower end with an inlet or with openings that permit the liquid in the container to exert pressure on the confined gaseous medium in said chamber and create a pressure therein which varies according to the depth of the liquid in the container. In the form of my invention herein illustrated, which is particularly adapted for use on vehicles, the pressure chamber is combined with a substantially cup-shaped member whose bottom is spaced away from the bottom of the pressure chamber so as to form a relatively shallow compartment that communicates with the lower end of the hollow member down through which the liquid and gaseous medium is conducted, said shallow compartment receiving gaseous medium and preventing it from being carried away from beneath the pressure chamber, said cup-shaped member having openings that establish communication between same and the interior of the liquid container.

Figure 1 of the drawings is a vertical sectional view of a quantity indicator for liquids constructed in accordance with my invention, and Figure 2 is an enlarged vertical sectional view of the pressure chamber and certain of the parts that are associated with same.

In the construction of my device 3 represents a liquid container, or tank. This tank is provided with a bottom 4, in which an opening 5 is formed. Around this opening is secured a ring 6, which has a portion 7 projecting upwardly into the tank, thus forming a sediment trap. This upward projection is provided with a rightangular downward projection 8, the outer face or vertical portion of which is provided with screw threads 9, over which a clamping ring 10 is adapted to be secured. Projecting within the container, or tank 3 is a cup 11, that surrounds the lower end portion of a pressure chamber 14, said cup being provided with a plurality of outwardly bent portions or flutes 12. These flutes form passages 13 between the cup 11 and the air pressure chamber 14. The air pressure chamber 14 and the cup 11 are secured together at the portions of the cup located between the flutes. The air pressure chamber 14 is provided with a concave bottom 15, the center of which is provided with a depressed portion 16. This depressed portion has the openings 17 formed therein, as well as a central opening 18 through which the portion 19 of the draining plug 20 passes. The cup 11 is provided with a horizontally projecting portion 21 that forms a flange 22. After the flange 22 has been formed, the material out of which the cup is constructed again extends horizontally toward the center, thus forming a horizontal portion 23, and between the horizontal portions 21 and 23 is securely clamped the flange 24 of the deflecting shield 25. This deflecting shield is made convex and has a central opening 26ᵃ through which the portion 19 of the drain plug passes. The cup 11, as well as the deflecting shield 25, are provided with openings 26; these openings registering and allowing communication between the tank and the underside of the shield 25. Through one of these openings is inserted the end 26ᵃ of the filling spout 27. This spout is provided near its upper end with the perforated enlargement 28, the perforations allowing the escape of liquid into the tank in the event the liquid is poured in faster than the end 26ᵃ will permit to escape. These perforations permit, as is obvious, the ingress of air into the tube 27 and a certain volume of air will be contained in said tube above the liquid within the tube. A portion of the air above the liquid within the tube will be trapped and carried down in the tube and discharged with the liquid by the weight or pressure of the liquid above the trapped air which is splashed through the openings. Secured to the upper end of the enlargement 28 is the cap 29, which has air vents 30 formed therein. Within the container is located the air pipe 31, which has its end 32 secured to the top of the compressed air chamber 14, its end 33 being secured within the coupling 34. This coupling is secured through the side of the container 3 by means of the lock nut 36 and to this coupling is secured the pipe 35, which has its opposite end secured to the gauge 37. The filler pipe 27 is provided with a flange 38 so that it can be attached to the container by means of screws 39. Within the filler pipe is secured a rod 40, which projects entirely across the opening and is for the purpose of splitting the flow of liquid while being poured into the container and thus allowing it to grasp and hold a certain amount of air in the form of bubbles, which are delivered by the liquid underneath the shield 25.

The operation of my device is, as follows:

The container being empty, there is only atmospheric pressure within the pressure chamber 14; when the filling of the container is commenced the liquid will pass down through the filling tube 27, be split by the rod 40 and become aerated i. e., carry air in the shape of bubbles with it, and out through the opening 26ᵃ, which will be released from the liquid and strike the under portion of the shield 25. These air bubbles will continue to pass into the tank proper until a liquid seal has been formed, which will be when the liquid contacts with the inside of the lower edge of the air pressure chamber. After this seal has been formed the bubbles will rise through the liquid and lodge against the bottom 15, and after a sufficient amount of air has accumulated underneath the bottom to uncover the openings 17, the air will be permitted to enter these openings and rise upward in the air pressure chamber 14. As the liquid continues to rise it will flow through the passageways 13 formed by the flutes 12 and cause an upward pressure of air in the chamber, and a portion of the liquid will rise in the air pressure chamber until the air pressure set up within the chamber is sufficient to prevent the entrance of any more liquid. This pressure will be transferred to the gauge 37 by means of the pipes 31 and 35, and thus indicate the quantity of liquid within the container.

It is a well known fact that liquids, especially when confined and caused to exert pressure on air, will absorb a certain amount of this air, and in order to make my device accurately operative an additional supply of air to take the place of that absorbed must be furnished or the device would become inoperative. This additional air is supplied by the replenishing of the liquid in the tank through the spout 27 and also by the splashing of the liquid in the tank into the openings or perforations of the spout when the liquid is agitated. When it is desired to drain the entire tank, or in the event that the openings become clogged the sediment plug 20 may be removed and the entire tank washed out without disturbing any of the pipe connections or the filler tube.

My purpose of forming the openings in the enlarged portion 28 is that when liquid is forced into the tank from a measuring pump the opening 26ª at the bottom of the filler tube will not be sufficient to allow all of the liquid to pass therethrough, but the tube 27 will become filled and have a sort of checking effect on the liquid contained therein; when this occurs the openings will allow the excess liquid to pass therethrough and into the container.

It is obvious that the perforations formed in the enlargement 28 will also permit the ingress of air into the tube 27 and this free air, as distinguished from the air in the liquid, will be discharged downwardly through the tube and escape with the liquid contained in the tube beneath the air pressure chamber. My invention contemplates two methods of replacing the absorbed air in the air pressure chamber: One is by means of the liquid poured through the tube and the other by means of the air admitted either as trapped air or as air contained in the liquid which passes through the perforations by the splashing of the liquid in the tank when the said liquid is agitated. It is obvious that in the movement of the vehicle on which the apparatus is used a certain quantity of liquid will pass through the perforations and will enter the tube and be discharged beneath the pressure chamber. This splashed liquid contains air which will escape in the form of air bubbles into the pressure chamber, and, as previously pointed out, a certain quantity of air will also pass into the tube 27 and form above the liquid level in the tube, and when the volume of splashed liquid through the openings is greater than the volume of the liquid below the air, this air will be trapped and also be discharged beneath the air pressure chamber.

In devices of this character, it is obvious for the gauge 37 to register accurately that a normal liquid level must be maintained in the chamber 14, and, broadly speaking, the object of my invention is to maintain this level, regardless of the causes which produce fluctuations or variations therein.

It will be seen from the foregoing description that air is supplied to the pressure chamber automatically and without the employment of any extraneous pumping devices or the like, thereby maintaining at all times, when the device is in use, a constant volume of air in the pressure chamber for the accurate functioning of the apparatus.

It is also obvious that the invention herein described is not limited in its applications to use in connection with tanks or containers for gasoline or volatile hydrocarbons; nor only where air is the gaseous medium used in the pressure chamber and in the container above the body of liquid whose level it is desired, by the apparatus, to indicate; as it is apparent that the invention may be used in connection with other liquids and other gaseous media than those specified.

Having fully described my invention what I claim is:

1. A quantity indicating device comprising a liquid container, an air chamber within and near the bottom of said container and adapted at its base for communication with the liquid in the container, an air pipe connected to said chamber, a gauge connected to said air pipe, and means for conducting the liquid poured into the container in filling into proximity to the pressure chamber, and means for trapping the air contained in such poured liquid and for discharging the air into the pressure chamber to replace the absorbed air in said chamber.

2. A quantity indicating device comprising a liquid container, an air pressure chamber located within and near the bottom of said container and adapted at its base for communication with the liquid in the container, a filler tube having a reduced outlet and secured to the container, said reduced outlet terminating beneath the air pressure chamber, an inverted perforated dish-shaped bottom secured to the air pressure chamber, a pressure gauge and a pipe connection between the air pressure chamber and gauge.

3. A quantity indicating device comprising a liquid container, an air pressure chamber located within and near the bottom of said container and adapted at its base for communication with the liquid in the container, a gauge, a connection between said pressure chamber and gauge, a filler tube carried by the container and having its lower end extending beneath and in communication with the air pressure chamber.

4. A quantity indicating device comprising a liquid container, an air pressure chamber therein provided at its base with means to trap and conduct air into the chamber, an air pipe connected to said chamber, a gauge connected to said air pipe, and means for receiving liquid poured into the container and discharging it beneath the air pressure chamber.

5. A quantity indicating device comprising a liquid container, an air pressure chamber located within said container and communicating with the liquid at the full depth to be measured, a conducting tube extending above the liquid in the container and having a discharge outlet terminating beneath the point of communication of said air pressure chamber with the liquid, a pressure gauge, a pipe connection between said air chamber and gauge, said conducting tube being provided near its upper end with an opening for the ingress of air and the liquid in the tank when splashed and agitated, the air in the splashed liquid and that entrapped thereby in said conducting tube being discharged and directed into said air pressure chamber for replacing the absorbed air in the pressure chamber.

6. A quantity indicating device comprising a liquid container, an air pressure chamber having an opening in its bottom and located in said container adjacent the bottom thereof, and air pipe connected to said chamber, a gauge connected to said air pipe, an elongated hollow member carried by said container and terminating at one end beneath said air pressure chamber and provided with an opening above the top of the liquid in the container, said elongated hollow member adapted to have liquid and air forced therethrough and be discharged beneath the air pressure chamber, the air thus delivered beneath the chamber adapted to pass through the opening in the pressure chamber for restoring lost volume of air therein.

7. A quantity indicating device for liquid containers comprising an air pressure chamber in said container and in communication with the liquid at the full depth to be measured, an air pipe connected to said chamber, a gauge connected to said air pipe, and means extending from a point above the liquid in the container and terminating beneath the air pressure chamber for receiving and conducting air beneath said chamber by the movement of the liquid within the container, the movement of said liquid acting to force the air downward into said chamber.

8. A quantity indicating device comprising a liquid container, a pressure chamber secured therein communicating with the liquid at the full depth to be measured, a guage, a conduit connecting said gauge with said pressure chamber, and means whereby the movement of the liquid within the container automatically delivers a pressure carrying medium to the pressure chamber.

9. A quantity indicating device for a liquid container comprising a pressure chamber in communication with the liquid in said container at the full depth to be measured, a pipe secured to said pressure chamber, a gauge secured to said pipe, and means within the container whereby the movement of the liquid in said container will automatically entrap and intermittently and forcibly conduct and release a gaseous medium under and into the pressure chamber and pipe to supply gaseous medium therein.

10. In an apparatus for indicating the quantity of liquid in a container, a container that holds the liquid, a chamber communicating with said container at the full depth to be measured and in which pressure is created by the head or weight of said liquid, an indicator connected to said chamber and operated by the pressure set up in said chamber, and means located within the container whereby the agitation of the liquid in said container causes a gaseous medium to be supplied to said pressure chamber for the purpose described.

11. In an apparatus for indicating the quantity of liquid in a container, a container that holds the liquid, a chamber in which pressure is created by the head or weight of said liquid, an indicator operated by the pressure in said chamber, a connection between said indicator and pressure chamber, and means communicating with said chamber whereby the agitation, movement or splashing of the liquid automatically entraps and forces the gaseous medium to said chamber.

12. In an apparatus for indicating the quantity of liquid in a container, a chamber submerged at the full depth to be measured and adapted to have pressure created therein by the weight or head of the liquid whose depth is to be determined, an indicator, a conduit connecting said chamber and indicator, and means for automatically maintaining the desired quantity of gaseous medium in the submerged chamber, consisting of a hollow member carried by said container and adapted to receive liquid and a gaseous medium therefrom, said hollow member adapted to conduct said liquid and gaseous medium to a point where the gaseous medium will enter the pressure chamber in the event the volume of gaseous medium that operates the indicator has become diminished due to absorption, contraction or other cause.

13. An apparatus for indicating the quantity of liquid in a container, comprising a container that holds the liquid, a pressure chamber located therein at the full depth to be measured and having an inlet through which the liquid in said container can enter said pressure chamber and create pressure therein, an indicator connected to said chamber and operated by the pressure therein, a substantially cup-shaped member that forms a shallow compartment beneath the pressure chamber and communicates with the interior thereof secured to said pressure chamber, and a hollow member carried by said container and having its lower end terminating in said compartment and adapted to receive from said container and above the liquid level therein and conduct down into said compartment and beneath said pressure chamber liquid containing a gaseous medium.

14. An apparatus for indicating the quantity of liquid in a container comprising a pressure chamber submerged in the liquid whose quantity is to be determined at the full depth of said liquid and provided at its lower end with an inlet through which liquid can enter said chamber and create pressure therein, a gauge operated by the pressure in said chamber, a conduit connected to said chamber and gauge, a hollow member carried by said container and terminating below said chamber and arranged so as to entrap liquid and air from the container and carry the same through said hollow member and discharge it from the lower end of the hollow member beneath the chamber, and means for directing the liberated air into said chamber for the purpose described.

15. An apparatus for indicating the quantity of liquid in a container comprising a pressure chamber submerged in the liquid whose quantity is to be determined and provided with passages whereby the liquid can exert pressure on a gaseous medium confined in said chamber thus creating pressure therein, a gauge, a conduit connecting said chamber and gauge, and a hollow member extending upward from a point below and adjacent said pressure chamber and having an enlarged upper end that is in direct communication with the interior of the container that holds the liquid, the lower end of said hollow member being open so as to permit the escape therefrom of the liquid and air that accumulates in said hollow member when the apparatus is in use, said air being delivered beneath and into the pressure chamber through said passages.

16. In an apparatus of the character described, a pressure chamber provided with a bottom having an opening therethrough and located in a liquid at the full depth to be measured, automatic means for delivering a gaseous medium beneath said pressure chamber and an auxiliary chamber located below the bottom of said pressure chamber and communicating with said opening, and adapted to receive and prevent lateral displacement of the gaseous medium so that the same will enter the pressure chamber for maintaining in said chamber a constant volume of gaseous medium, said chamber arranged to permit the escape of excess gaseous medium.

17. An apparatus for indicating the quantity of liquid in a container, comprising a pressure chamber submerged in the liquid whose quantity is to be determined and having an opening therein through which the liquid can exert pressure on the gaseous medium confined in the said chamber, thereby creating pressure therein, a gauge, a conduit connecting said chamber and gauge, and a hollow member extending upwardly through the body of liquid from a point below said pressure chamber and having an enlarged open upper end that is in direct communication with the interior of the container that holds the liquid, the lower end of said hollow member being open so as to permit the escape therefrom of the liquid and air that accumulates in said member when the apparatus is in use, the gaseous medium so escaping being directed through the opening into the pressure chamber.

18. A quantity indicating device for a liquid container comprising a pressure chamber located within said container and communicating with the liquid therein at the full depth to be measured, a pressure gauge, a conduit for connecting said pressure chamber and gauge, means located within said container for trapping a gaseous medium and a part of the liquid in the container when the surface level of the same is varied, and means connected to said trapping means and terminating beneath and communicating with the pressure chamber for conducting said trapped gaseous medium and liquid beneath the pressure chamber for the delivery of said gaseous medium therein.

19. A quantity indicating device comprising a liquid container, a pressure chamber located in said container and submerged in the liquid and communicating therewith at the full depth to be measured, means for trapping air and part of the liquid when the liquid is bodily moved, means for conducting the said trapped air and liquid to a point beneath the pressure chamber, and means for preventing the lateral displacement of the air so delivered, said air being directed into said pressure chamber at its point of communication with the liquid in the container.

20. A quantity indicating device for liquids confined in a container, open to atmospheric pressure, comprising a pressure chamber communicating at its bottom with the liquid at the full depth to be measured, in combination with a conducting means extending to and open at a point above the normal level of the liquid, its opposite end having an opening and terminating beneath the pressure chamber, said conducting means with its openings being constructed and arranged with respect to the liquid level that under the movement of liquid, air will be entrapped and conducted beneath the pressure chamber.

21. In an apparatus for indicating the quantity of liquid in a container, the combination with the container that holds the liquid, of a chamber in which pressure is created by the head or weight of said liquid, an indicator operated by the pressure in said chamber, a connection between said indicator and pressure chamber, said chamber and connection adapted to contain a gaseous medium for transferring the pressure from said chamber to said indicator, and means so constructed and arranged as to receive a gaseous medium, said medium being entrapped by the movement of the liquid in the container which movement causes liquid to enter said means above the gaseous medium therein, the movement of the liquid also conducting the gaseous medium to said chamber.

22. A device for indicating the quantity of liquid in a container that is open to atmospheric pressure, which liquid varies greatly from time to time in volume and liquid level, comprising a submerged pressure chamber, arranged to confine a gaseous medium, communicating with the liquid in the container at the full depth to be measured, a gauge operating to show the liquid level and consequent liquid volume in the said container, a conduit connecting said chamber and gauge, and means for automatically maintaining the desired quantity of gaseous medium in the submerged chamber, consisting of means within the container communicating with said chamber for confining liquid and air above the normal level of liquid in said container, said means adapted to convey and direct the entrapped air governed by the downward movement and flow of the liquid in said means, said entrapped air being delivered from the lower end thereof and passing into said pressure chamber under the action of the movement of said liquid.

23. A device for indicating the quantity of liquid in a container open to atmospheric pressure, comprising a chamber communicating with the liquid at the full depth to be measured, a gauge, a conduit connecting said chamber and gauge, means communicating with said chamber and located within said container for automatically trapping air by the liquid when its surface reaches a fixed level, said means being constructed and arranged whereby variation in elevation of the surface of the liquid above and below said level will cause said trapped air to be conducted downward for delivery to the pressure chamber.

24. An apparatus for indicating the quantity of liquid in a container, which liquid varies greatly from time to time in volume and liquid level, comprising a pressure chamber submerged in the liquid whose quantity is to be determined and having an opening therein through which the liquid can exert pressure on a gaseous medium confined in the said chamber, thereby creating pressure therein, a gauge, operating to show the liquid level and consequent liquid volume in the said container, a conduit connecting said chamber and gauge and means for automatically maintaining the desired quantity of gaseous medium in the submerged chamber, consisting of means for incorporating air in a portion of the liquid of the container which is gravity-flowing and which flow is induced by variation in level of the liquid within the container, and means for directing said air and liquid below the level of communication of the pressure chamber with the liquid.

25. In an air trap for a depth gauge, a tank, an air chamber positioned in the tank at its bottom portion, a pipe communicating at its lower end directly with said air chamber below the normal level of the liquid in the tank and having its upper end terminating in the tank above the normal liquid level, said upper end of said pipe being so formed and positioned as to receive liquid when the liquid in the tank is splashed by agitation of the tank, air being entrapped in such received liquid and being transferred thereby through said pipe to said air chamber, said air chamber having in its lower portion an aperture adapted to permit passage of liquid between the air chamber and the tank.

26. In an air trap for a depth gauge, a container for liquid, an air chamber submerged in the liquid of the container and in communication therewith at its lower portion, means located in the container above the liquid level and adapted to receive a portion of the liquid contents of the container and air entrapped thereby when the liquid in the container is splashed by agitation of the container, and means for conveying the said portion of liquid and entrapped air to the air chamber.

27. In a self-replenishing air trap for a liquid depth gauge, a tank, an air chamber submerged in the liquid of the tank, means for establishing closed communication between said air chamber and the interior of the tank above the normal liquid level and being there open for receiving a portion of the liquid contents of the tank and air entrapped by said portion when the liquid in the tank is splashed above its normal level by agitation of the tank, whereby air is supplied to said air chamber, said air chamber having an aperture permitting escape of liquid from the air chamber to the tank and permitting action of the pressure of liquid in the tank upon the air in the air chamber.

28. In combination, a tank, an air trap for a pressure depth gauge, comprising an air chamber submerged in the liquid of the tank, an inflow pipe having its upper portion open and in communication with the interior of the tank above the normal liquid level and so formed and positioned as to receive liquid from the tank and air entrapped thereby when the liquid in the tank is splashed by agitation of the tank, said pipe extending into the lower part of said air chamber, and said air chamber having in its lower portion an aperture permitting return of liquid from the air chamber to the tank and action of the pressure of liquid in the tank upon the air within the air chamber.

29. In an air trap for a depth gauge, a container for liquid, a casing closed to the container at its upper portion and having an opening at its lower portion and submerged in the liquid of the container, providing a liquid-sealed air chamber, means located in the container above the liquid level and adapted to receive a portion of the liquid contents of the container and air entrapped thereby when the liquid in the container is splashed by agitation of said container, and means for conveying said portion of liquid and entrapped air and discharging the same at a point so located with reference to said opening that the entrapped air discharged by said means will escape into the air chamber.

30. In a self-replenishing air trap for a depth gauge, a tank, an air chamber submerged in the liquid in the tank, a pipe having its lower end connected to the lower portion of the air chamber and its upper end provided with an enlarged mouth opening into the tank above the normal liquid level and adapted to receive liquid from the tank and air entrapped thereby when the liquid in the tank is splashed, said air chamber having an opening forming a passage between the air chamber and the tank and permitting return of liquid to the tank and action of the pressure of liquid in the tank upon the air in the chamber.

31. In a device of the character described, a container for liquid, an air chamber submerged in the liquid of the container and having an opening in its lower portion, and a conduit having an enlarged open end above the liquid level and adapted to have air entrapped therein by a portion of the liquid contents of the container delivered thereto by splashing due to agitation of the container, the discharge end of said conduit being so located relative to said opening as to permit the entrapped air discharged therefrom to escape into said air chamber.

32. In an air trap for a depth gauge for tanks, a tank, an air chamber submerged in the liquid in the tank, an apertured partition dividing said chamber into upper and lower compartments, a pipe connected to the lower compartment and extended upwardly, the upper end of said pipe having an enlarged mouth opening into said tank above the normal liquid level and adapted, when the liquid in the tank is splashed, to receive liquid from the tank and air entrapped thereby, whereby the received portion of the liquid and its entrapped air are transferred to the air chamber, said lower compartment being apertured to permit passage of liquid from said lower compartment to the tank and action of the pressure of the liquid in the tank upon the air in said compartments.

33. In a device of the character described, a container, an air chamber submerged in the liquid of the container and having an opening in its lower portion, and a conduit for conveying air to said air chamber, said conduit having an opening above the liquid level and adapted to receive a portion of the liquid contents of the container when the liquid is splashed by agitation of the container, whereby air is entrapped and conveyed in said conduit by said portion of the liquid, the discharge end of said conduit being so located relative to said air chamber opening as to permit said entrapped air discharged therefrom to escape into said air chamber.

In testimony whereof, I have signed my name to this specification.

JAMES MACCALLUM, Jr.